US006496326B1

(12) United States Patent
Boutaghou

(10) Patent No.: US 6,496,326 B1
(45) Date of Patent: Dec. 17, 2002

(54) NOISE AND VIBRATION REDUCTION IN COMPUTER DISK DRIVES

(75) Inventor: Zine-Eddine Boutaghou, Vadnais Heights, MN (US)

(73) Assignee: Seagate Technology LLC, Scotts Valley, CA (US)

(*) Notice: Subject to any disclaimer, the term of this patent is extended or adjusted under 35 U.S.C. 154(b) by 98 days.

(21) Appl. No.: 09/591,100

(22) Filed: Jun. 8, 2000

Related U.S. Application Data

(60) Provisional application No. 60/138,689, filed on Jun. 11, 1999.

(51) Int. Cl.[7] .............................................. G11B 33/14
(52) U.S. Cl. .................................................. 360/97.03
(58) Field of Search .......................... 360/97.02, 97.03; 369/247, 263

(56) References Cited

U.S. PATENT DOCUMENTS

| | | | | |
|---|---|---|---|---|
| 5,214,549 A | | 5/1993 | Baker et al. ............. 360/97.02 |
| 5,235,482 A | | 8/1993 | Schmitz .................. 360/97.02 |
| 5,408,372 A | | 4/1995 | Karam, III ................ 360/104 |
| 5,422,767 A | | 6/1995 | Hatchett et al. .......... 360/98.01 |
| 5,510,954 A | * | 4/1996 | Wyler ....................... 361/685 |
| 5,517,375 A | | 5/1996 | Dion et al. ............... 360/98.07 |
| 5,587,855 A | | 12/1996 | Kim ......................... 360/97.02 |
| 5,666,239 A | | 9/1997 | Pottebaum ................ 360/97.03 |
| 5,757,580 A | | 5/1998 | Andress et al. .......... 360/97.02 |
| 5,770,133 A | * | 6/1998 | Boutaghou ................ 264/135 |
| 5,781,373 A | | 7/1998 | Larson et al. ........... 360/97.02 |
| 5,801,905 A | * | 9/1998 | Schirle et al. ............. 360/104 |
| 5,858,509 A | | 1/1999 | Polch et al. ................ 428/166 |
| 5,886,851 A | | 3/1999 | Yamazaki et al. ....... 360/97.02 |
| 5,898,537 A | * | 4/1999 | Oizumi et al. .......... 360/97.01 |
| 5,982,580 A | * | 11/1999 | Woldemar et al. ....... 360/97.02 |
| 6,002,546 A | * | 12/1999 | Yagi et al. ............... 360/97.02 |
| 6,172,842 B1 | * | 1/2001 | Satoh et al. ............. 360/97.01 |
| 6,209,842 B1 | * | 4/2001 | Anderson et al. .......... 248/560 |
| 6,229,668 B1 | * | 5/2001 | Huynh et al. ............ 360/97.01 |

* cited by examiner

*Primary Examiner*—Brian E. Miller
(74) *Attorney, Agent, or Firm*—Moser, Patterson & Sheridan LLP

(57) ABSTRACT

A disk drive assembly includes a housing having openings substantially filled with a polymeric material. Exemplary polymeric materials include liquid crystal polymers. The polymeric regions can be formed in various parts of the housing, including the base plate or the cover, and can help reduce noise and vibrations that occur during operation of the disk drive.

19 Claims, 4 Drawing Sheets

NOISE AND VIBRATION REDUCTION IN COMPUTER DISK DRIVES

CROSS-REFERENCE TO RELATED APPLICATIONS

This application claims the benefit of priority of U.S. Provisional patent application No. 60/138,689, filed Jun. 11, 1999.

BACKGROUND

This invention relates to noise and vibration reduction in computer disk drives.

In typical disk drive assemblies; a major source of acoustic noise is sympathetic vibration of the disk drive housing caused by the spindle motor used to spin the disks or by the actuator used to move the read/write heads across the disks for data access. The disk drive assemblies are commonly in the form of a rectangular housing with a spindle motor and actuator motor mounted to one internal surface of the housing. A plate is used to cover the housing and motors. In many assemblies the shaft of the spindle motor is attached to the base plate. Therefore the housing vibrates at resonant frequencies, increasing the total amount of acoustic noise. With high performance requirements expected to increase to rotational speeds greater than 30,000 rotations per minute (rpm), noise and vibrations have become an even greater engineering concern.

Vibrations of the plate are typically caused by the bending and torsion modes associated with the plate. Approaches to reducing noise and vibration include providing an isolation device between the motors and the housing. Another approach is to provide damping (constraint) layers. The foregoing approaches to reducing noise and vibration are directed toward eliminating or reducing the torsion and bending modes of the entire plate. Improvements for reducing the vibrations and noise of the entire plate are desirable, particularly for high rotational speeds.

SUMMARY

A disk drive assembly can include a housing having regions of a polymeric material. The polymeric regions can include openings substantially filled with a polymeric material such as a liquid crystal polymer. The polymeric regions, which may form a uniform pattern, can be formed in various parts of the housing, including the base plate or the cover, and can help reduce noise and vibrations that occur during operation of the disk drive.

In one aspect, a disk drive assembly includes a housing having openings substantially filled with a polymeric material. Various components can be disposed within the housing including a read/write head assembly, an actuator motor to control positioning of the read/write head assembly, a recording medium, and a spindle motor to control rotation of a recording medium.

A method of manufacturing a disk drive assembly also is disclosed and includes forming a housing having a pattern of holes, substantially filling the holes with a polymeric material, and mounting internal components of the disk drive assembly within the housing. A mold injection or other technique can be used to substantially fill the openings with the polymeric material.

One or more of the following advantages may be present in various implementations. By reducing the affects of noise and/or vibrations during operation, the disk drive can be operated at higher speeds. Furthermore, the techniques described here can be used in conjunction with or instead of constrain layers. When used instead of such constraint layers, the current techniques can be used without increasing the thickness of the base plate. That can be important for certain applications, such as mobile disk drives, in which the disk drive must operate within strict Z-height limitations. Moreover, the disclosed techniques do not require an additional assembly step during manufacturing.

Other features and advantages of the invention will be apparent from the detailed description, the accompanying drawings and the claims.

DETAILED DESCRIPTION

Figure 1:
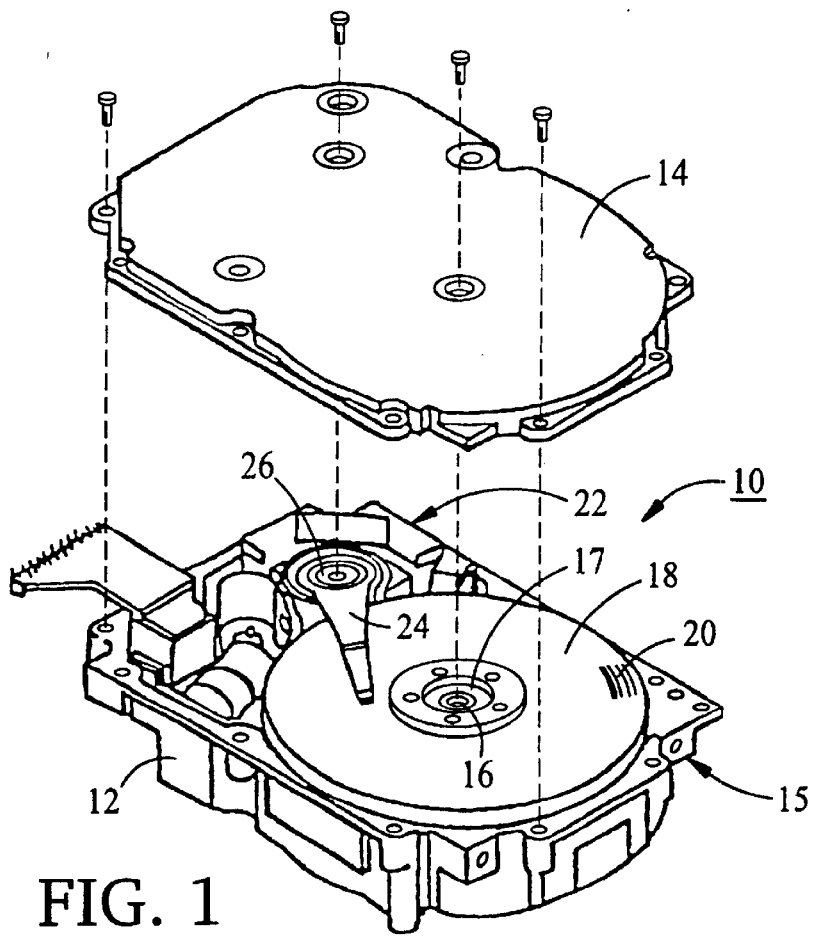
FIG. 1 illustrates an exemplary disk drive assembly.
Figure 2:
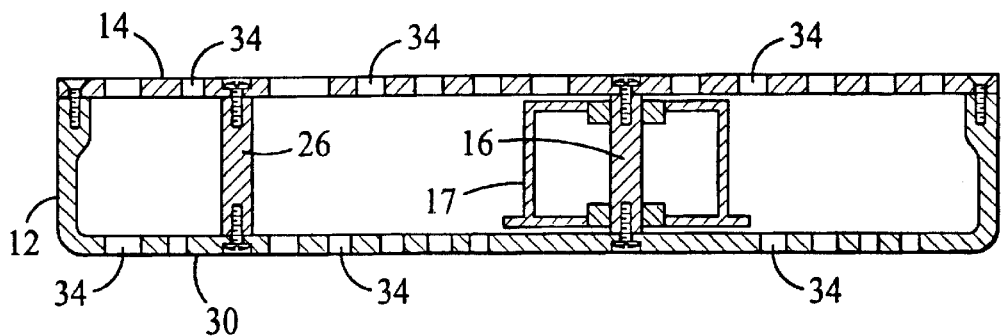
FIG. 2 illustrates a simplified cross sectional view of the disk drive assembly.

As shown in FIGS. 1 and 2, an exemplary disk drive assembly 10 has a housing 12 including a cover 14 and a base plate 30. In FIG. 1, the cover 14 has been removed to show the relationship between various internal mechanical components. A spindle motor shaft 16, supporting a spindle motor 17, is mounted to the base plate 30 within the disk drive assembly 10. Mounted on the spindle motor 17 are a number of circular disks 18 coated with a magnetic recording medium. Digital information is recorded on the disks 18 in a large number of circular, concentric data tracks 20. When power is applied to the disk drive assembly 10, the spindle motor 17 rotates the disks 18 at a constant high speed. In the example shown, the disks 18 rotate in a counter clockwise direction.

An actuator motor 22 also is mounted to the base plate 30 and operates under the control of electronic circuitry (not shown) to selectively rotate an actuator body 24 about an actuator pivot shaft 26. Attached to the actuator body 24 are multiple read/write head assemblies 28 that are used for recording and retrieving information on the data track 20.

Disk drives typically have the data tracks 20 on the disks 18 at a density greater than 1000 tracks per inch measured radially on the disk surface. Furthermore, the actuator motor 22 used to move the read/write head assemblies 28 can typically seek to any desired data track 20 in less that about 20 milliseconds on the average. Therefore, the precision and the stability of the geometric relationship between the disks 18 and the read/write head assemblies 28 are important.

To increase the precision and stability of the relationship between the disks 18 and the read/write head assemblies 28, both ends of the spindle motor shaft 16 and the actuator pivot shaft 26, about which the actuator 24 pivots, are secured to the base plate 30 and the cover 14. Machine screws 30 can be used to fasten the cover 14 to the housing 12 by mated apertures in the cover 14 and threaded bores in the housing. When the disk drive assembly 10 is completely assembled, tilt between the actuator body 24 and the spindle motor 17 can be reduced.

The spindle motor shaft 16 can be fastened to the base plate 30 and to the cover 14 by screws. The actuator pivot shaft 26 also can be fastened to the housing and to the cover by screws. Similarly, the cover 14 can be fastened to the sides of the housing 12 by screws. Mounting the spindle motor 17 and the actuator 22 in that manner can reduce the wobble of the spindle motor and actuator, thus preserving the intended geometric relation between the read/write head assembly and the disks.

The housing generally can be formed of a metal such as aluminum. To reduce vibrations and noise, the base plate 30 and/or other parts of the housing 12 can be constructed with a series of openings 34. The openings, which may extend completely or only partially through the base plate, are filled with a polymeric material. The openings 34 can be any variety of geometrical shapes including, but not limited to, square, rectangular, circular, pentagonal, hexagonal and octagonal. The size of the openings can vary depending on the particular implementation. In some implementations, the housing 12 and openings 34 can be formed by extrusion. After formation of the openings, a mold injection process or other technique can be used to fill the openings 34 with the polymeric material. Exemplary materials include liquid crystal polymers and Teflon-based polymers. Other polymers can be used as well. Generally, polymers that that do not result in out-gassing and that avoid particulates are preferred.

Figure 3:
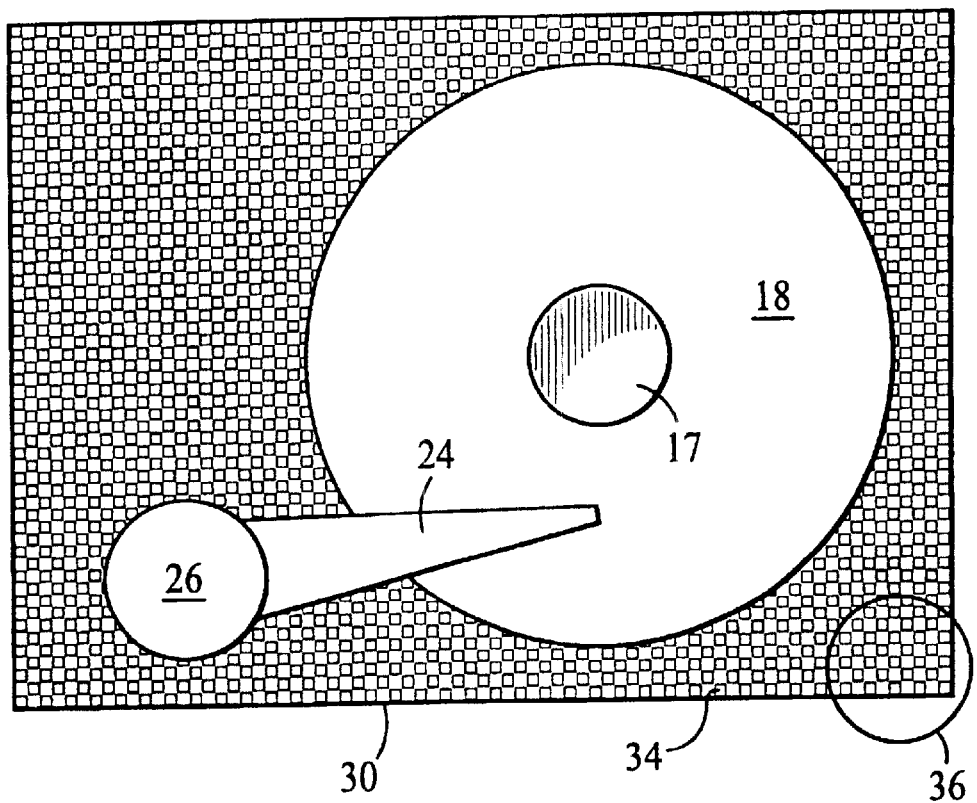
FIG. 3 is a top view of a base plate of the disk drive assembly.
Figure 4A:
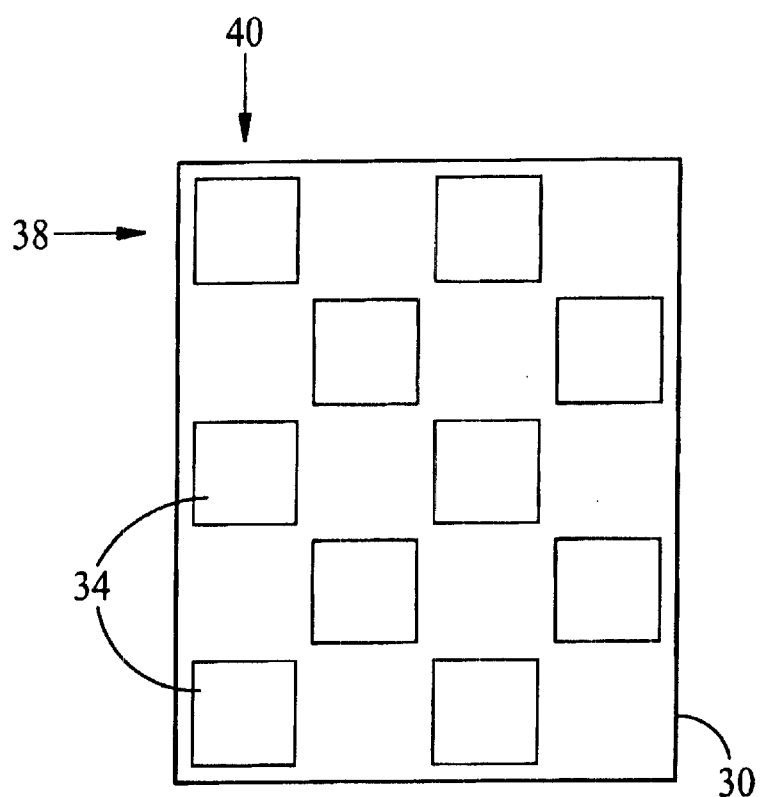
FIG. 4A is an enlarge view of an area of the base plate of FIG. 3.
Figure 4B:
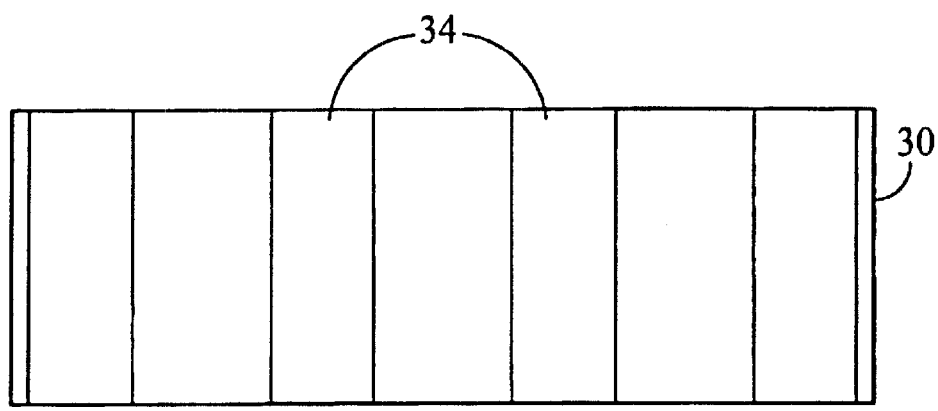
FIGS. 4B and 4C are cross-sectional views of the base plate of FIG. 4A according to different implementations.
Figure 4C:
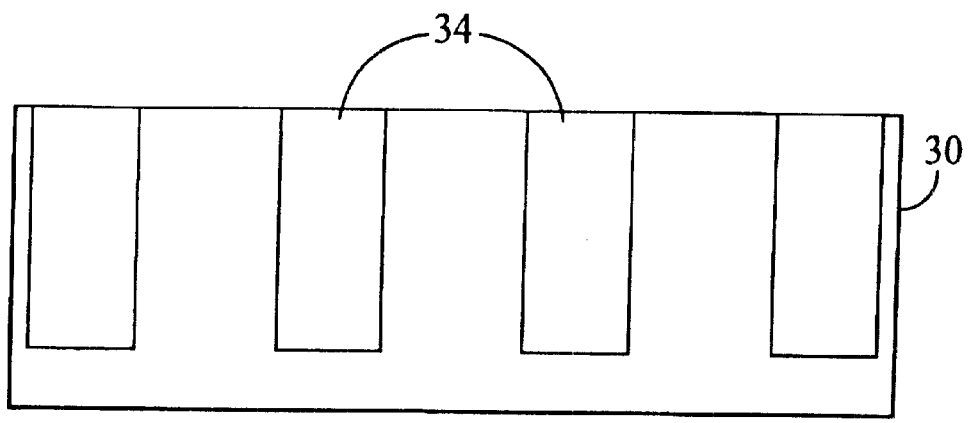

FIG. 3 illustrates a schematic top view of one implementation of the base plate 30. For clarity, most of the inner mechanical and electrical components are not shown. FIGS. 4A and 4B illustrate enlarged partial views of the circled area 36 shown in FIG. 3. In the illustrated implementation, the filled openings 34 form an alternating pattern, such that in a single row 38 or column 40, every other region is filled with the damping material, such as a polymer. In the embodiment of FIG. 4B, the polymer-filled openings 34 extend through the entire width of the base plate 30. Thus, the damping material makes up slightly less than fifty percent of the base plate 30. FIG. 4C illustrates an alternative embodiment in which the polymer-filled openings 34 extend only partially through the base plate 30.

Figure 5:
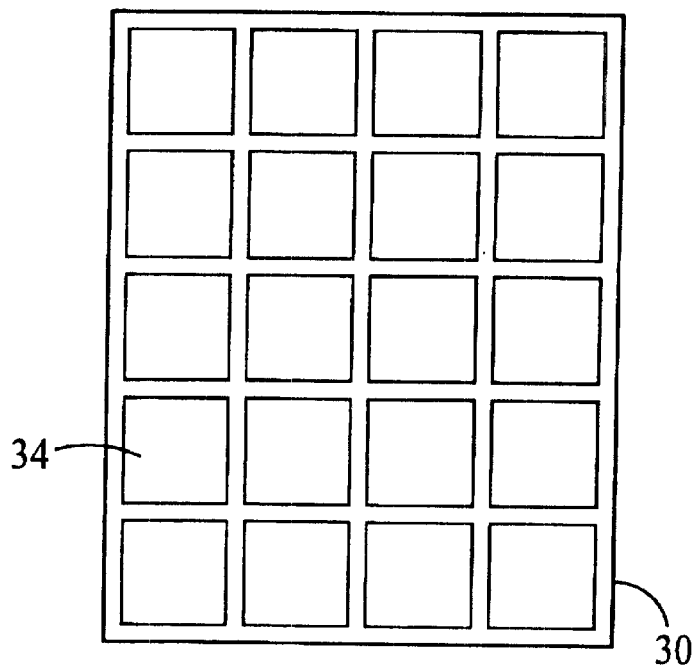
FIG. 5 is an enlarged view of an area of the base plate of FIG. 3 according to another implementation.

FIG. 5 illustrates an enlarged top view of a pattern of polymer-filled openings 34 in the base plate 30 according to another embodiment. In this embodiment, the polymer-filled openings 34 comprise a high percentage of the surface area of the base plate 30. As before, the polymer-filled openings 34 may extend completely through the width of the base plate 30 or only partially through it.

In many implementations, a substantially uniform pattern of polymer-filled openings 34 is provided in the base plate 30. However, the pattern need not be uniform, and in some cases, a non-uniform pattern may be desirable.

Polymer-filled openings can be provided in other parts of the housing 12, including the cover 14 and/or the sides.

Although the theory of operation is not critical to the invention, it is believed that the filled openings create vibrational excitations that eliminate single mode excitations in the housing 12. The energy emanating from the spindle and the actuator is uniformly distributed in the plate 14 and excites individual vibrational modes equally with no preferential directions. Instead of exciting the bending and twisting modes of the entire plate, each individual opening 34 is excited causing small vibrational excitations instead of large rigid body-like motions of the base.

Other implementations are within the scope of the claims.

What is claimed is:

1. A disk drive assembly comprising:
   a housing including a two-dimensional pattern of openings substantially filled with a polymeric material, the two-dimensional pattern comprising a large plurality of openings occupying slightly less than 50% of the surface area covered by the pattern; p1 a read/write head assembly disposed within the housing;
   an actuator motor disposed within the housing to control positioning of the read/write head assembly;
   a recording medium disposed within the housing; and a spindle motor disposed within the housing to control rotation of a recording medium.

2. The disk drive assembly of claim 1 wherein the housing includes a uniform pattern of openings substantially filled with a polymeric material.

3. The disk drive assembly of claim 1 wherein the housing includes a base plate, and wherein at least some of the polymer-filled openings are in the base plate.

4. The disk drive assembly of claim 3 wherein the polymeric material includes a liquid crystal polymer.

5. The disk drive assembly of claim 3 wherein the polymer-filled openings extend completely through a thickness of the base plate.

6. The disk drive assembly of claim 3 wherein the polymer-filled openings extend partially through a thickness of the base plate.

7. The disk drive assembly of claim 1 wherein the housing includes a cover, and wherein at least some of the polymer-filled openings are in the cover.

8. The disk drive assembly of claim 1 wherein the polymeric material includes a liquid crystal polymer.

9. The disk drive assembly of claim 1 wherein the polymeric material includes a low-outgassing polymer.

10. A disk drive assembly comprising:
    a base plate having a two-dimensional pattern of regions consisting essentially of a polymeric material, the two-dimensional pattern comprising a large plurality of openings occupying slightly less than 50% of the surface area covered by the pattern;
    a spindle motor;
    a spindle motor shaft supporting the spindle motor and mounted to the base plate;
    a recording medium mounted on the spindle motor;
    an actuator motor shaft mounted to the base plate;
    a read/write assembly; and
    an actuator motor mounted to the base plate to control positioning of the read/write assembly about the actuator motor shaft.

11. The disk drive assembly of claim 10 wherein the base plate includes a substantially uniform pattern of regions of polymeric material.

12. The disk drive assembly of claim 10 wherein the polymeric material includes a liquid crystal polymer.

13. The disk drive assembly of claim 10 wherein the polymeric material includes a low-outgassing polymer.

14. The disk drive assembly of claim 10 wherein the polymeric regions extend completely through a thickness of the base plate.

15. The disk drive assembly of claim 10 wherein the polymer-filled openings extend partially through a thickness of the base plate.

16. A method of manufacturing a disk drive assembly, the method comprising:

forming a housing having a two-dimensional pattern of holes, the two-dimensional pattern comprising a large plurality of openings occupying slightly less than 50% of the surface area covered by the pattern;

substantially filling the holes with a polymeric material; and mounting internal components of the disk drive assembly within the housing.

17. The method of claim 16 including using a mold injection technique to substantially fill the openings with the polymeric material.

18. The method of claim 16 wherein the polymeric material includes liquid crystal polymer.

19. The method of claim 16 wherein the housing is formed by an extrusion technique.

* * * * *